United States Patent
Lee et al.

(10) Patent No.: US 12,150,112 B2
(45) Date of Patent: Nov. 19, 2024

(54) METHOD AND DEVICE FOR SWITCHING RESOURCE ALLOCATION MODE IN WIRELESS COMMUNICATION SYSTEM

(71) Applicant: LG ELECTRONICS INC., Seoul (KR)

(72) Inventors: Jongyoul Lee, Seoul (KR); Hanbyul Seo, Seoul (KR); Giwon Park, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 511 days.

(21) Appl. No.: 17/593,323

(22) PCT Filed: Mar. 18, 2020

(86) PCT No.: PCT/KR2020/003689
§ 371 (c)(1),
(2) Date: Sep. 15, 2021

(87) PCT Pub. No.: WO2020/190020
PCT Pub. Date: Sep. 24, 2020

(65) Prior Publication Data
US 2022/0183028 A1 Jun. 9, 2022

Related U.S. Application Data

(60) Provisional application No. 62/910,371, filed on Oct. 3, 2019, provisional application No. 62/887,608, filed on Aug. 15, 2019.

(30) Foreign Application Priority Data

Mar. 18, 2019 (KR) .................. 10-2019-0030745
Mar. 25, 2019 (KR) .................. 10-2019-0033877

(51) Int. Cl.
*H04W 72/1263* (2023.01)
*H04W 4/40* (2018.01)
(Continued)

(52) U.S. Cl.
CPC ....... *H04W 72/1263* (2013.01); *H04W 72/23* (2023.01); *H04W 72/52* (2023.01);
(Continued)

(58) Field of Classification Search
CPC ............................... H04W 72/20; H04W 4/70
See application file for complete search history.

(56) References Cited

U.S. PATENT DOCUMENTS 10,206,235 B2   2/2019  Martin
2015/0271861 A1  9/2015  Li et al.
(Continued)

FOREIGN PATENT DOCUMENTS

CN   109076530   12/2018

OTHER PUBLICATIONS

PCT International Application No. PCT/KR2020/003689, International Search Report dated Jun. 24, 2020, 4 pages.
(Continued)

*Primary Examiner* — Raj Jain
(74) *Attorney, Agent, or Firm* — LEE, HONG, DEGERMAN, KANG & WAIMEY

(57) ABSTRACT

Proposed is a method for a first device to perform wireless communication. The method may comprise the steps of: receiving information related to the allocation of a first resource from a base station; transmitting sidelink information to a second device through the first resource on the basis of the information related to the allocation of the first
(Continued)

resource; and transmitting the sidelink information to the second device through a second resource on the basis of a preset condition.

12 Claims, 22 Drawing Sheets

(51) Int. Cl.
    *H04W 72/20*     (2023.01)
    *H04W 72/23*     (2023.01)
    *H04W 72/52*     (2023.01)
    *H04W 72/542*     (2023.01)

(52) U.S. Cl.
    CPC ............ *H04W 72/542* (2023.01); *H04W 4/40* (2018.02); *H04W 72/20* (2023.01)

(56) References Cited

U.S. PATENT DOCUMENTS

| | | | |
|---|---|---|---|
| 2016/0338095 A1 | 11/2016 | Faurie et al. | |
| 2017/0245245 A1 | 8/2017 | Kim et al. | |
| 2017/0295567 A1 | 10/2017 | Chen et al. | |
| 2018/0070264 A1* | 3/2018 | Saiwai | H04W 72/04 |
| 2019/0215806 A1* | 7/2019 | Chai | H04W 72/23 |
| 2021/0051527 A1* | 2/2021 | Baghel | H04W 72/30 |
| 2021/0243749 A1* | 8/2021 | Hoang | H04W 72/02 |
| 2022/0183028 A1* | 6/2022 | Lee | H04W 72/542 |

OTHER PUBLICATIONS

Fujitsu, "Discussion on Basic Resource Allocation Methods for NR-V2X Sidelink Communication," R1-1900250, 3GPP TSG RAN WG1 Ad-Hoc Meeting 1901, Jan. 2019, 13 pages.
Fraunhofer Iis, et al., "QoSManagement for NR-V2X," R1-1900358, 3GPP TSG RAN WG1 Meeting AH 1901, Jan. 2019, 7 pages.
Interdigital, Inc., "Discussion on QoS Management," R1-1902604, 3GPP TSG RAN WG1 #96, Mar. 2019, 5 pages.
Ericsson, "gNB-scheduled Resource Allocation for Sidelink," TDoc R2-1817949, 3GPP TSG-RAN WG2 #104, Nov. 2018, 7 pages.
European Patent Office Application Serial No. 20774764.3, Search Report dated Mar. 31, 2022, 8 pages.
LG Electronics, "Discussion on congestion control for PC5-based V2X," R1-1609187, 3GPP TSG RAN WG1 Meeting #86bis, Oct. 2016, 3 pages.
The State Intellectual Property Office of the People's Republic of China Application Serial No. 202080028912.3, Office Action dated Jun. 29, 2023, 7 pages.

* cited by examiner

FIG. 4
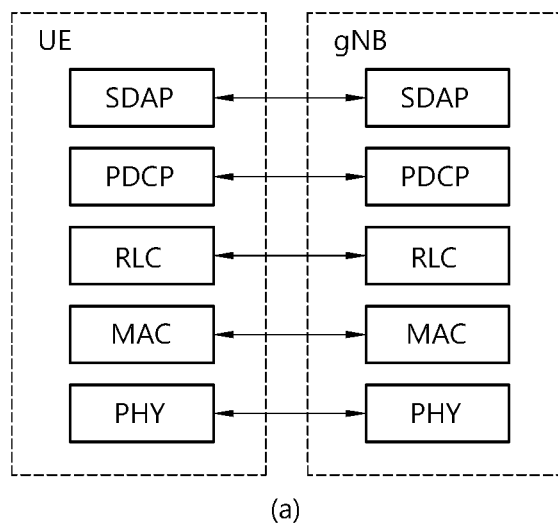
(a)
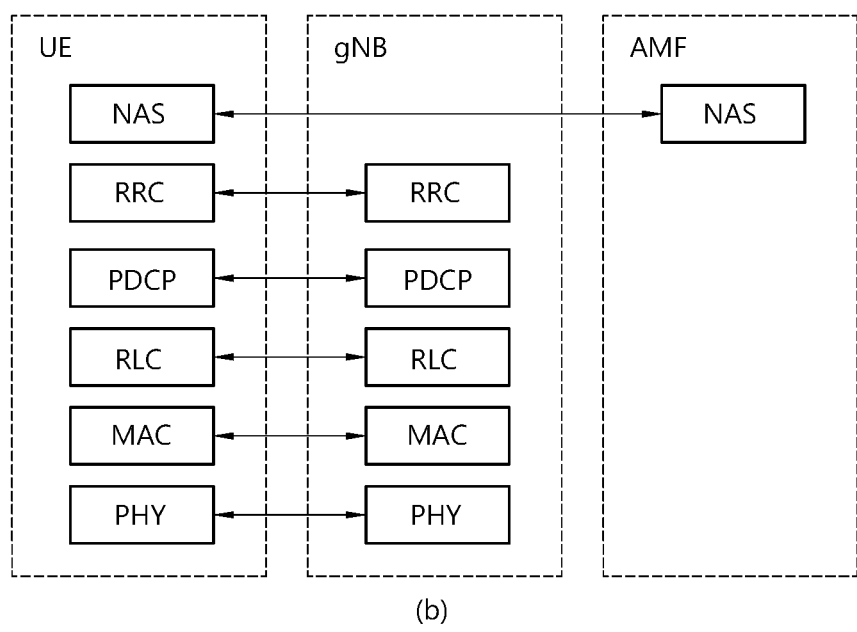
(b)

FIG. 8
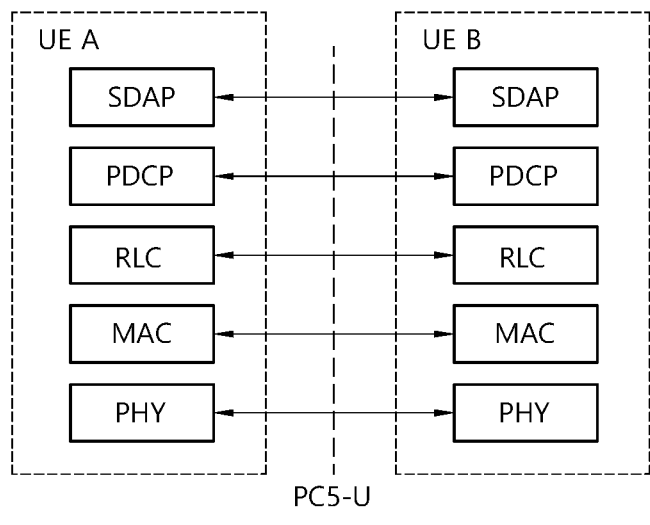
(a)
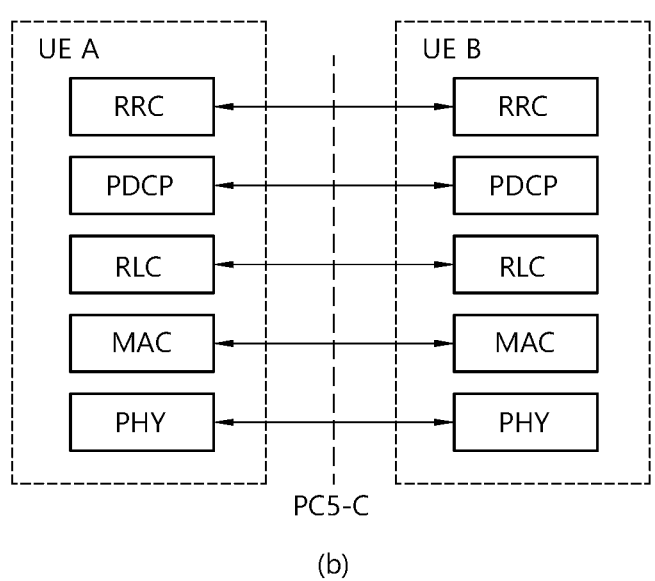
(b)

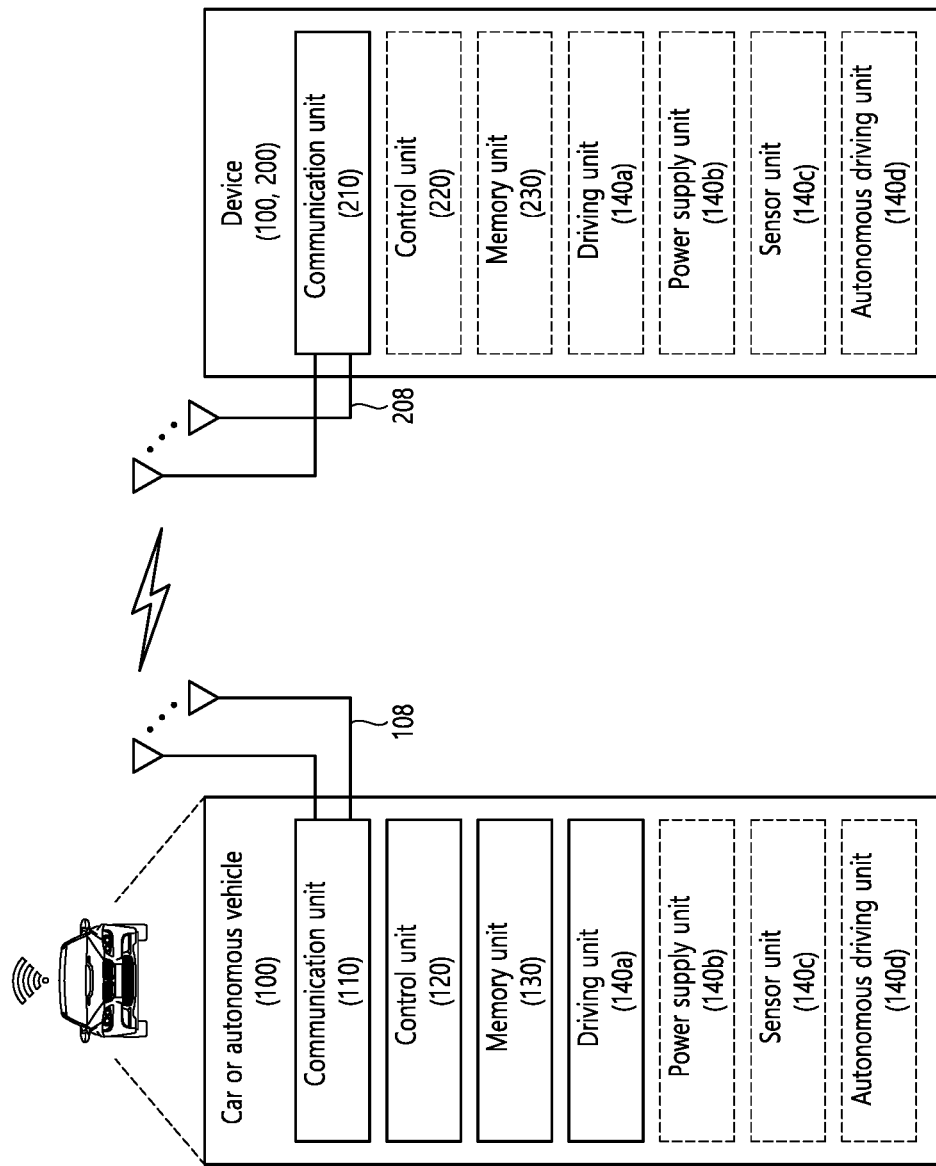

METHOD AND DEVICE FOR SWITCHING RESOURCE ALLOCATION MODE IN WIRELESS COMMUNICATION SYSTEM

CROSS-REFERENCE TO RELATED APPLICATIONS

This application is the National Stage filing under 35 U.S.C. 371 of International Application No. PCT/KR2020/003689, filed on Mar. 18, 2020, which claims the benefit of earlier filing date and right of priority to Korean Application Nos. 10-2019-0030745, filed on Mar. 18, 2019, and 10-2019-0033877, filed on Mar. 25, 2019, and also claims the benefit of U.S. Provisional Application No. 62/887,608, filed on Aug. 15, 2019, and 62/910,371, filed on Oct. 3, 2019, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in a wireless communication system, when a user equipment (UE) fails to transmit an uplink packet to the base station, the base station provides a retransmission uplink grant (UL grant) to the UE without explicit hybrid automatic repeat request (HARQ) feedback, and the UE may perform retransmission based on the received retransmission UL grant. Therefore, since the base station does not receive information for the transmission of the UE, the base station may have difficulty in properly allocating transmission resources to the UE. In addition, in the sidelink communication system, since the resource allocation mode can operate concurrently in a shared pool or a separate pool, switching between modes may be required.

Technical Solutions

In an embodiment, a method for a first device to perform wireless communication is proposed. The method may include receiving information related to an allocation of first resources from a base station, and transmitting sidelink information to a second device through the first resources based on the information related to the allocation of the first resources, and transmitting the sidelink information to the second device through second resources based on a pre-configured condition.

Effects of the Disclosure

A UE may effectively perform sidelink communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

FIG. 22 shows a car or an autonomous vehicle, in accordance with an embodiment of the present disclosure.

DESCRIPTION OF EXEMPLARY EMBODIMENTS

Figure 1:
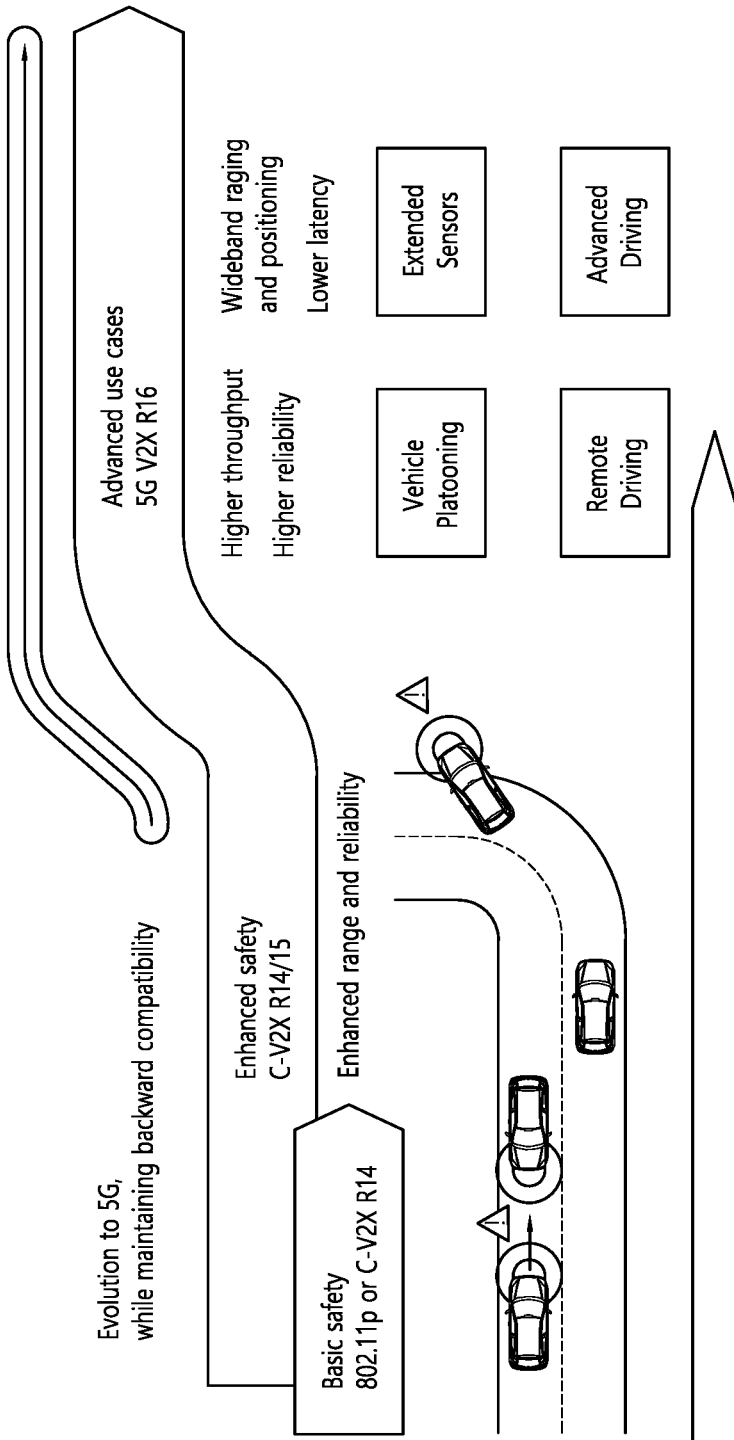
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
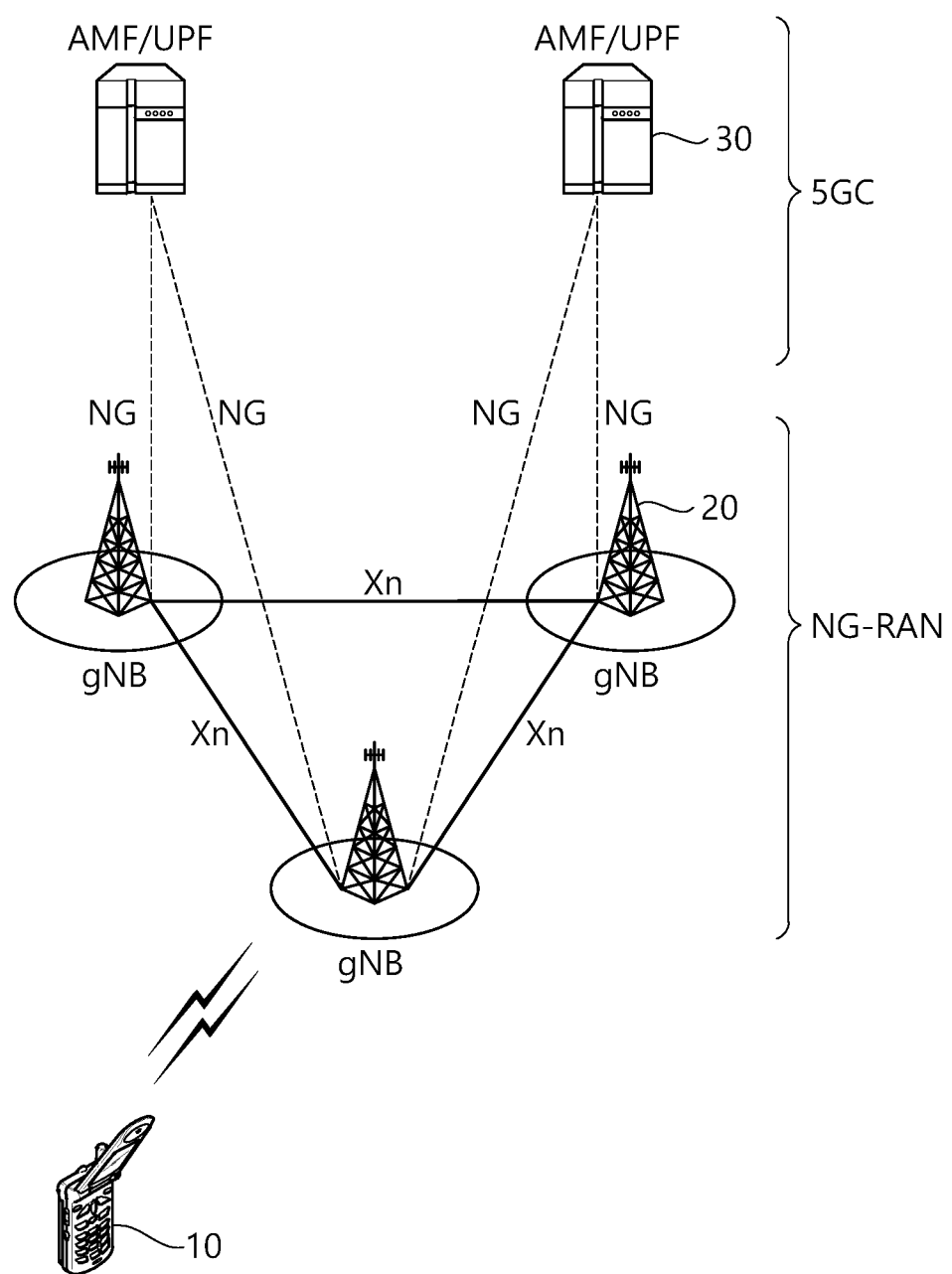
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
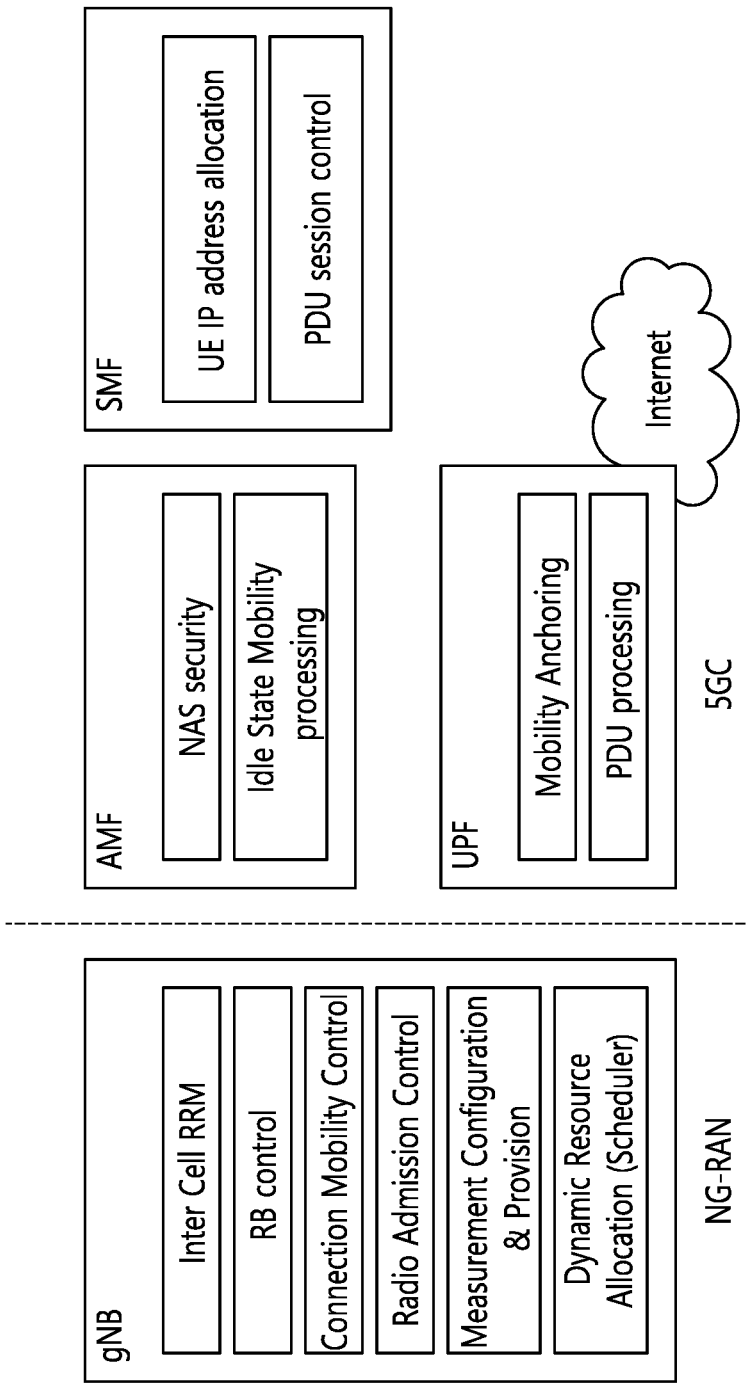
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
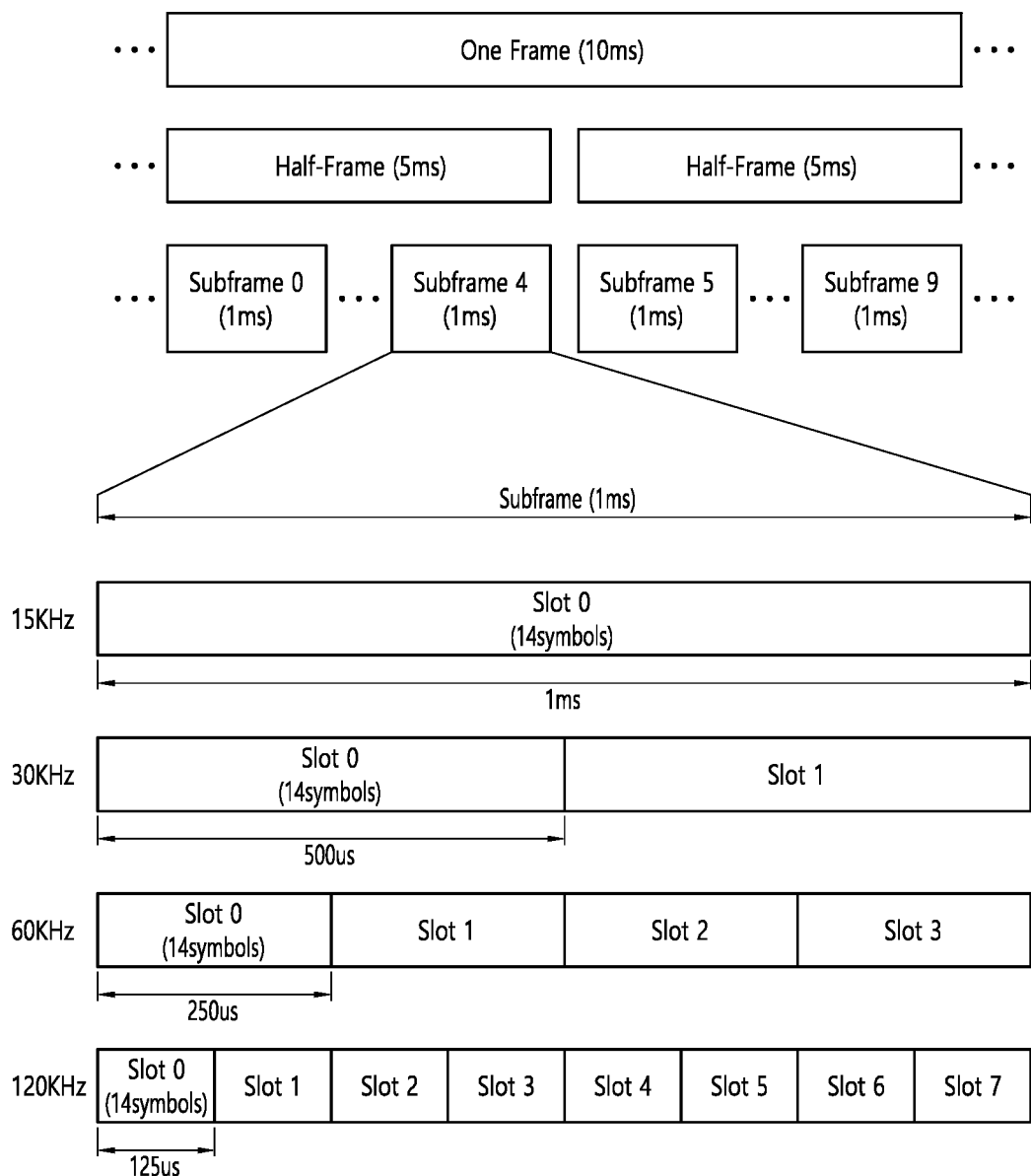
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame}_{slot}$) and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
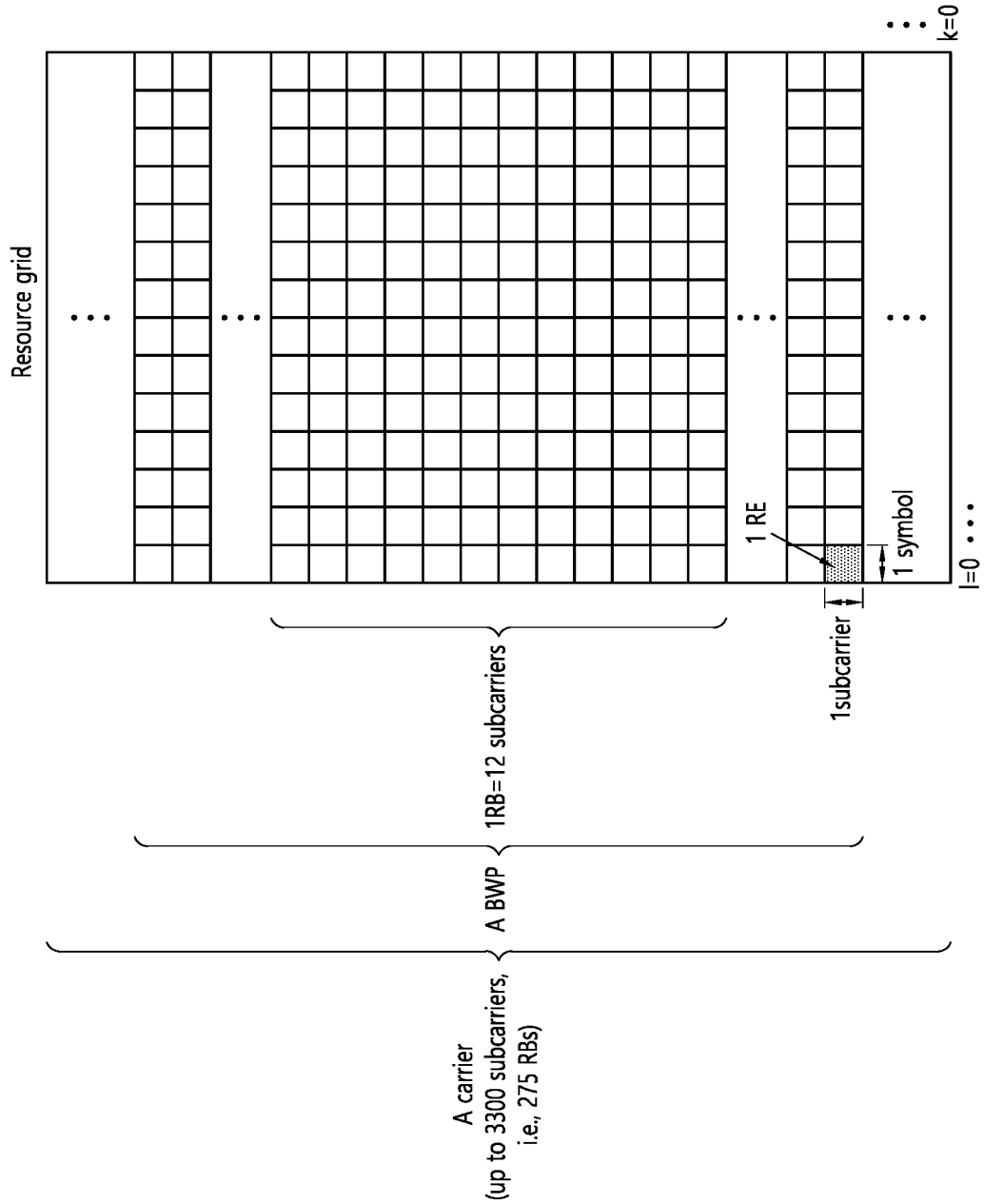
FIG. 6 shows a structure of a slot of an NR frame, in accordance with an embodiment of the present disclosure.

FIG. 6 shows a structure of a slot of an NR frame, in accordance with an embodiment of the present disclosure. Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
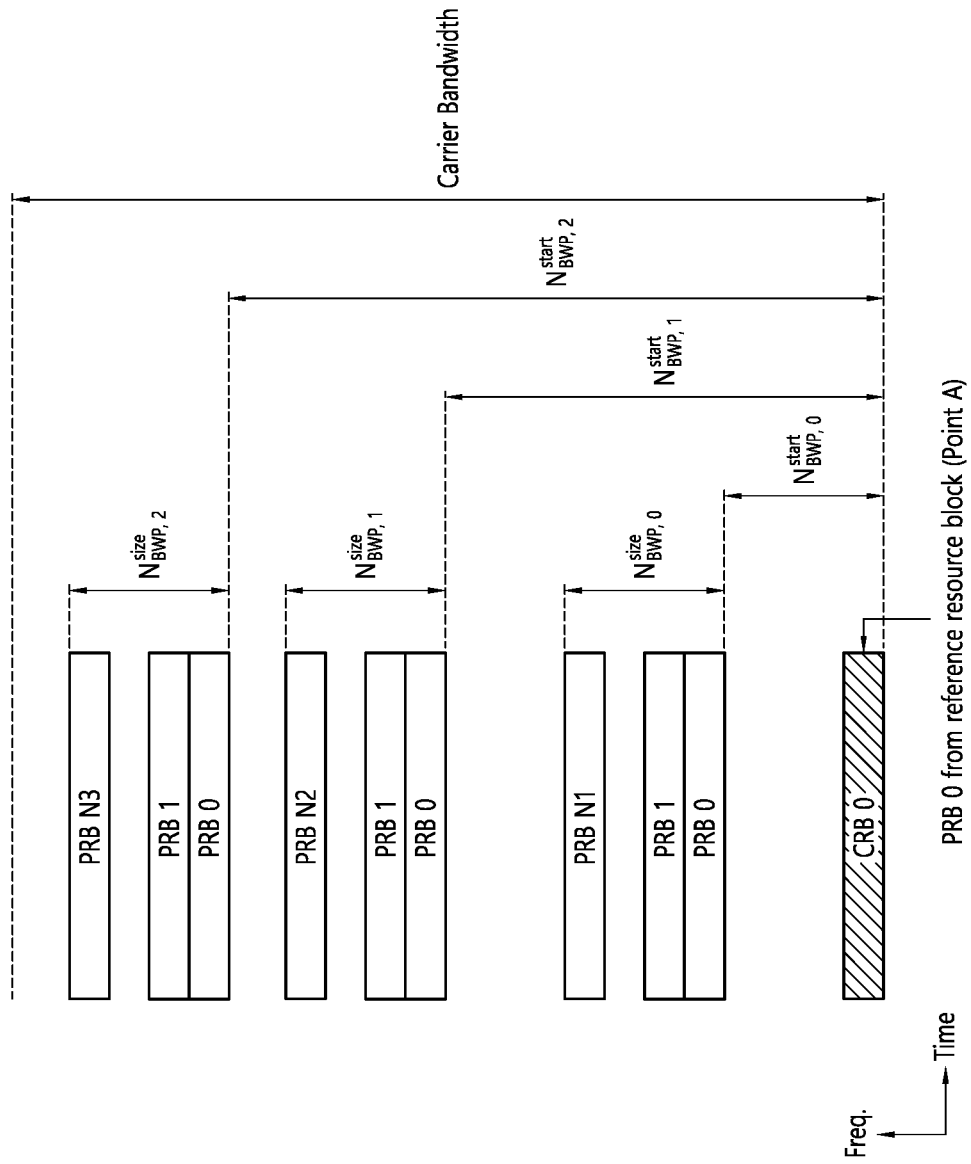
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
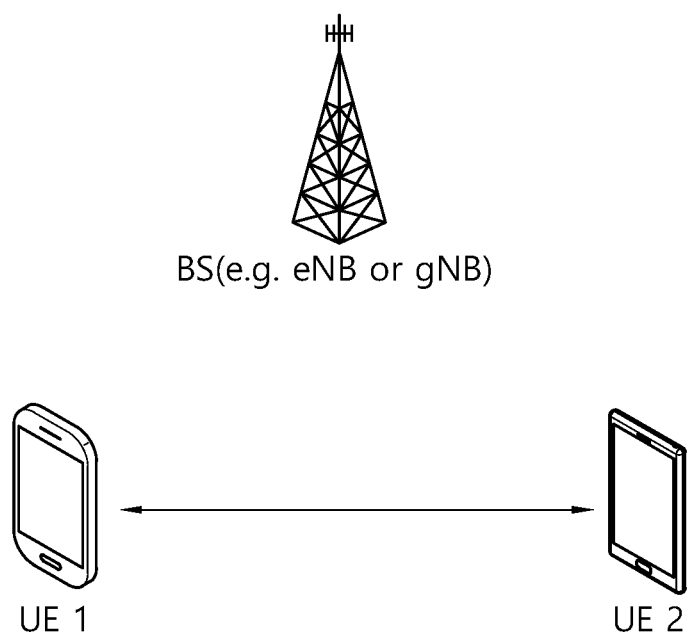
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
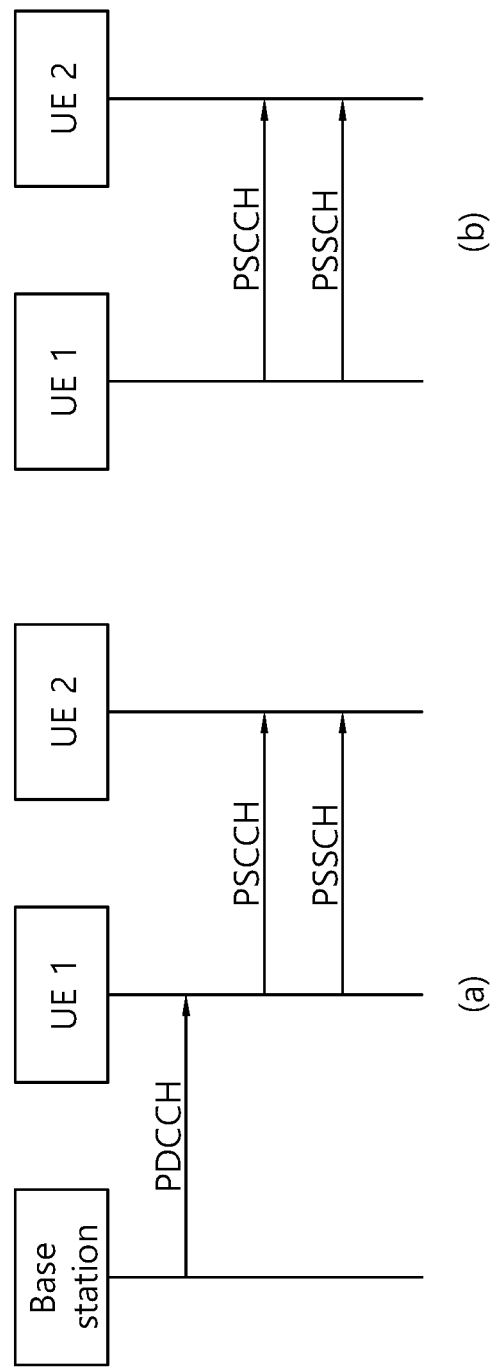
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a B S/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
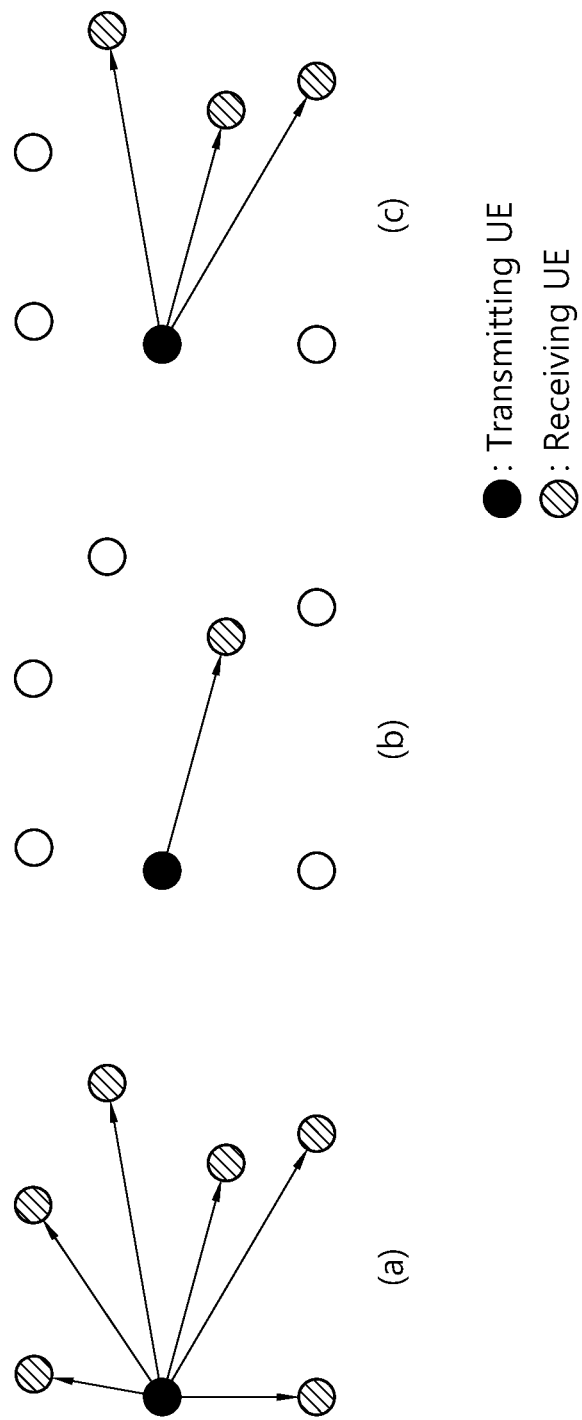
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the next-generation communication system, various use cases may be supported. For example, a service for communication such as an autonomous vehicle, a smart car, or a connected car may be considered. For this service, each vehicle can transmit and receive information as a communication terminal, select resources for communication with or without the base station's help depending on the situation, and send and receive messages between terminals.

Figure 12:
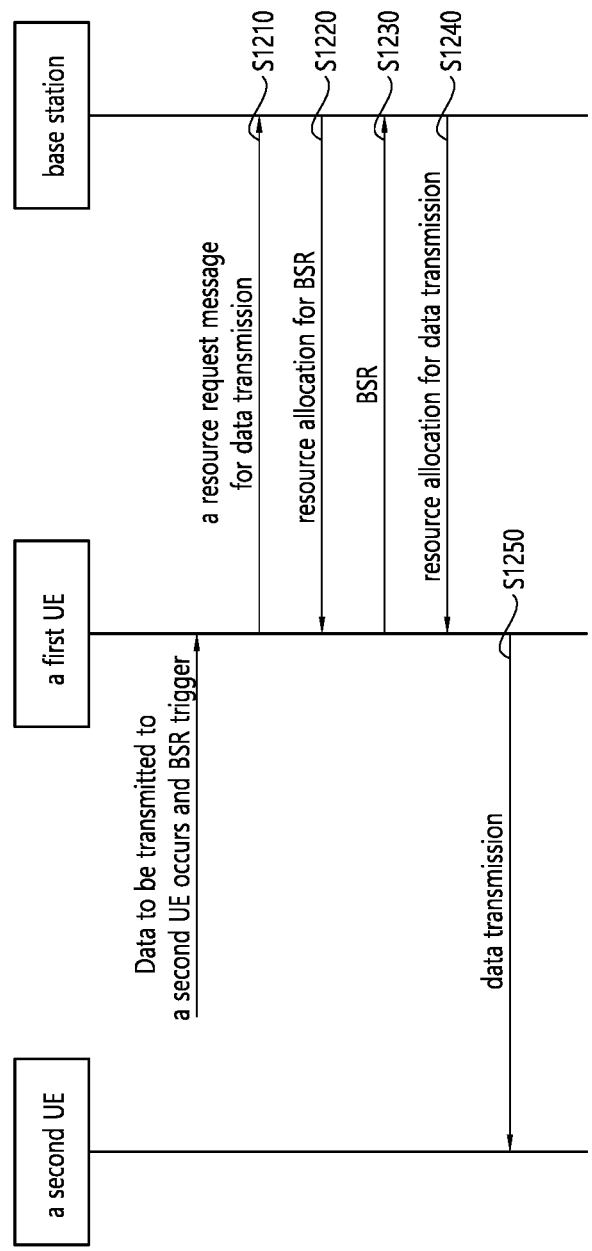
FIG. 12 shows a procedure in which a UE requests sidelink resources from a base station based on a scheduling request (SR) and a buffer state report (BSR).

FIG. 12 shows a procedure in which a UE requests sidelink resources from a base station based on a scheduling request (SR) and a buffer state report (BSR). An embodiment of FIG. 12 may be combined with various embodiments of the present disclosure.

Referring to FIG. 12, a first UE may be allocated resources for initial transmission. For example, the first UE may be a transmitting UE that transmits sidelink data to another UE. For example, the sidelink data may be included in sidelink information. For example, the sidelink information may include at least one of a sidelink message, a sidelink packet, a sidelink service, sidelink data, sidelink control information, and/or a sidelink transport block (TB). For example, the sidelink information may be transmitted through PSSCH and/or PSCCH. In step S1210, the first UE may transmit a resource request message for data transmission to the base station. For example, when data to be transmitted from the first UE to a second UE occurs and a buffer state report (BSR) is triggered for the first UE, the first UE may transmit a resource request message for data transmission to the base station. For example, the second UE may be a receiving UE that receives sidelink data from another UE. In step S1220, the first UE may be allocated resources for the BSR from the base station, and in step S1230, the first UE may transmit the BSR from the base station. In step S1240, the first UE may be allocated resources for data transmission from the base station, and in step S1250, the first UE may transmit data to the second UE using the resources allocated from the base station. For example, the base station may allocate resources to the first UE based on a dynamic resource allocation method or a configured grant type 1 resource allocation method.

Meanwhile, when a NR-Uu UE fails to transmit an uplink packet to the base station, the base station transmits a retransmission uplink grant (UL grant) to the UE without explicit HARQ feedback, and the UE perform retransmission based on the received retransmission UL grant. Accordingly, since the base station does not receive information on transmission of the UE, the base station may have difficulty in properly allocating transmission resources to the UE. In addition, in a sidelink communication system, since a resource allocation mode may simultaneously operate in a shared pool or a separated pool, a switching operation between modes may be required.

Therefore, according to various embodiments of the present disclosure, an operation and condition for a UE operating in resource allocation mode 1 (e.g., a mode in which a base station allocates transmission resources to a UE, and the UE performs transmission using a grant allocated by the base station) to switch to resource allocation mode 2 (e.g., a mode in which a UE performs resource allocation by itself) for allocating retransmission resources are proposed. Alternatively, for example, when a UE operating in resource allocation mode 2 satisfies a specific condition, a method of using resources allocated in resource allocation mode 1 for retransmission is proposed. In addition, for example, a method for switching a resource allocation mode is proposed. According to various embodiments of the present disclosure, the switching time of the resource allocation mode may be a time of occupying retransmission resources. For example, the switching time of the resource allocation mode may be a time of occupying initial resources. For example, in a scenario of switching the resource allocation mode when retransmission resources are allocated after initial resources are allocated, as described below, allocating the retransmission resources may be allocating another initial resources.

Hereinafter, a method and an apparatus for switching a resource allocation mode will be described according to an embodiment of the present disclosure.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 13:
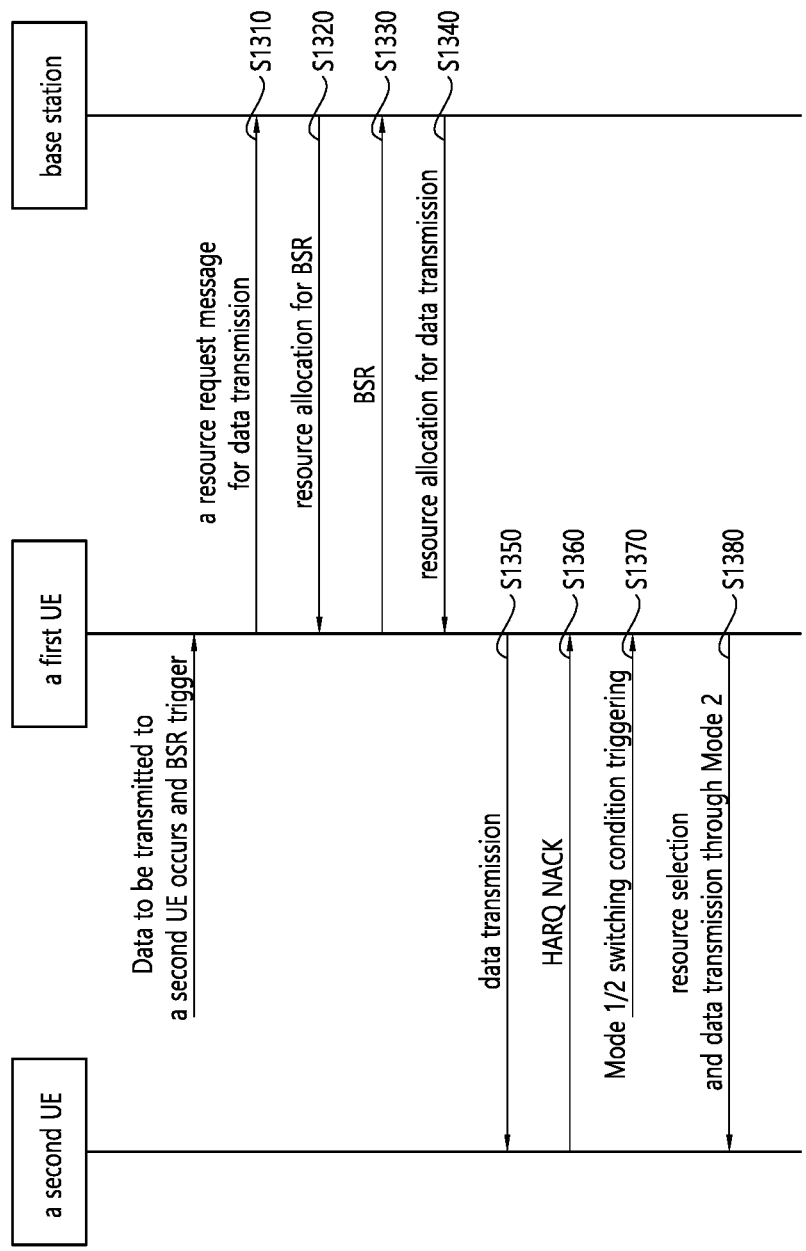
FIG. 13 shows a procedure in which a first UE switches a resource allocation mode according to an embodiment of the present disclosure.

FIG. 13 shows a procedure in which a first UE switches a resource allocation mode according to an embodiment of the present disclosure. An embodiment of FIG. 13 may be combined with various embodiments of the present disclosure.

Referring to FIG. 13, in step S1310, the first UE may transmit a resource request message for data transmission to the base station. For example, when sidelink data to be transmitted from the first UE to a second UE is generated and BSR is triggered for the first UE, the first UE may transmit a resource request message for data transmission to the base station.

In step S1320, the first UE may be allocated resources for the BSR from the base station, and in step S1330, the first UE may transmit the BSR from the base station. In step S1340, the first UE may be allocated resources for sidelink data transmission from the base station, and in step S1350, the first UE may transmit sidelink data to the second UE using the resources allocated from the base station. For example, the resources allocated from the base station to the first UE may be resources for initial transmission. For example, the base station may allocate resources to the first UE based on a dynamic resource allocation method or a configured grant type 1 resource allocation method.

In step S1360, the first UE may receive a HARQ feedback from the second UE. For example, if the HARQ feedback is a HARQ NACK, in step S1370, the first UE may switch a resource allocation mode. For example, the first UE may switch from a resource allocation mode 1 to a resource allocation mode 2 based on a pre-configured triggering condition. For example, the first UE may be configured to switch from the resource allocation mode 1 to the resource allocation mode 2 based on receiving the HARQ NACK from the second UE. Hereinafter, the pre-configured triggering condition will be described in detail.

According to an embodiment of the present disclosure, the operation of the first UE changing to the resource allocation mode 2 based on receiving the HARQ NACK from the second UE may be configured as a default operation for the first UE. For example, after the first UE is allocated resources related to initial transmission from the base station, the first UE may transmit data to the second UE using the allocated resources. In this case, when the first UE receives a failure message (NACK) related to the initial transmission from the second UE, the first UE may need to allocate resources related to retransmission. For example, the first UE may allocate retransmission resources by itself based on a pre-configured resource pool. For example, the pre-configured resource pool may be a resource pool related to resource allocation mode 2 or a resource pool coexisting with resource allocation mode 1. For example, based on the default operation, the base station may allocate only the resources related to the initial transmission to the first UE. Therefore, when the first UE changes from the resource allocation mode 1 to the resource allocation mode 2 based on receiving the HARQ NACK from the second UE, the first UE can reduce a delay of requesting resource allocation from the base station in order to be allocated resources related to retransmission. In addition, even if the HARQ process between the first UE and the second UE is performed, it is possible to satisfy a delay budget of the sidelink service.

According to an embodiment of the present disclosure, when the first UE uses resources related to resource allocation mode 1 for initial transmission and a specific trigger condition is satisfied, the first UE may use resources related to resource allocation mode 2. For example, the first UE may use the resources related to resource allocation mode 1 for the initial transmission or the retransmission in preference to resources related to resource allocation mode 2. For example, it may be configured for the first UE to use resources related to resource allocation mode 1 for the initial transmission or the retransmission in preference to resources related to resource allocation mode 2. For example, the first UE may preferentially use resources allocated from the base station as an operation of the resource allocation mode 1, and when a specific condition is satisfied, the first UE may switch to an operation of the resource allocation mode 2 and select resources. Herein, for example, the time of switching to resource allocation mode 2 may be any one of a time point at which initial transmission is performed, a time point at which retransmission resources are selected after initial transmission, or a time point at which retransmission resources are selected again after retransmission has failed. For example, it is assumed that an operation in which the base station allocates resources to the first UE has higher reliability than an operation in which the first UE selects resources by itself.

For example, in relation to the above-described specific trigger condition, the first UE may switch the resource allocation mode based on a reliability related to sidelink information. For example, a triggering condition related to the reliability of the sidelink packet may be configured for the first UE. For example, if there is a QoS metric (e.g., proximity-based service per-packet reliability (PPPR)) mapped according to a sidelink packet or a sidelink flow, if the reliability of the sidelink information is lower than the pre-configured threshold, the first UE may switch from resource allocation mode 1 to resource allocation mode 2. For example, when the parameter related to the reliability of the sidelink information is smaller than a pre-configured threshold value, the reliability of the sidelink information may be low. For example, when the reliability-related parameter (e.g., proximity-based service per-packet priority (PPPP)) is defined as having a higher reliability as a lower value, if the parameter related to the reliability of the sidelink information is higher than the pre-configured threshold, the first UE may switch from resource allocation mode 1 to resource allocation mode 2.

For example, in relation to the specific trigger condition described above, the first UE may switch the resource allocation mode based on the delay time (e.g., latency budget) related to the sidelink information. For example, in the case of dynamic scheduling, it may be necessary for the first UE to transmit the SR to the base station to request resources for retransmission and receive a grant for the BSR from the base station and the transmit the BSR to the base station and receive a grant for data transmission. In this case, when the latency budget supported by the sidelink service may be exceeded due to a round trip time delay according to scheduling. If the latency budget is exceeded due to the round-trip time delay according to scheduling, the first UE may change to resource allocation mode 2 to perform resource selection. For example, when N+M>t_d, the first UE may switch to resource allocation mode 2. Herein, for example, t_d may be a deadline related to the latency budget of the sidelink packet, N may be a delay related to the operation of scheduling from the base station in resource allocation mode 1, M may be a processing delay to be performed as data is transmitted through resources allocated from the base station. For example, the first UE may switch the resource allocation mode based on the deadline related to the latency budget of the sidelink packet, the delay related to the operation of scheduling from the base station in resource allocation mode 1, and the processing delay to be performed as data is transmitted through resources allocated from the base station.

In addition, for example, when the first UE receives a configured grant resource from the base station in resource allocation mode 1, the first UE may perform resource selection by changing to resource allocation mode 2 based on a delay time (e.g., a latency budget). For example, even when the base station allocates a configured grant resource to the first terminal based on UE assistance information transmitted by the first UE, if the latency budget of the sidelink data to be transmitted by the first UE is less than a resource periodicity of the resources allocated from the base station, the first UE may perform resource selection by changing from resource allocation mode 1 to resource allocation mode 2. For example, sidelink communication may support a Uu beam management. In this case, when a Uu beam failure occurs, in order to solve the problem that the first UE may not be allocated appropriate resources from the base station, the first UE may determine which resources to use among the pre-configured first resources (e.g., configured grant resources) and the pre-configured second resources (e.g., normal pool), and the first UE can prevent communication delay due to the Uu beam failure from occurring. For example, the pre-configured first resources may be resources related to resource allocation mode 1. For example, the pre-configured second resources may be resources related to resource allocation mode 2. That is, for example, if characteristics of data traffic to be transmitted by the first UE (e.g., packet periodicity or packet size) does not create a packet delay budget or a physical layer problem for a configured grant resource, the first UE may use the configured grant resource as it is. On the other hand, for example, if characteristics of data traffic to be transmitted by the first UE (e.g., packet periodicity or packet size) creates a packet delay budget or a physical layer problem for a configured grant resource, the first UE may prevent communication delay by performing sidelink communication through resources related to resource allocation mode 2.

For example, in relation to the specific trigger condition described above, the first UE may switch the resource allocation mode based on a minimum communication range related to the sidelink information. The minimum communication range may be a parameter for determining HARQ transmission related to V2X PC5 communication. That is, for example, only UEs within the minimum communication range mapped to the sidelink service to be transmitted by the first UE may be subjected to the HARQ process, and the first UE may receive HARQ feedback from the UEs within the minimum communication range. However, because of the distance calculation error or the minimum communication range associated with another transmitting UE, the first UE may still receive HARQ feedback outside the minimum communication range. For example, the first UE may determine the HARQ feedback outside the minimum communication range as transmission of relatively insignificant sidelink information. Accordingly, for example, when a distance between the first UE and the second UE exceeds the minimum communication range, the first UE may switch from resource allocation mode 1 to resource allocation mode 2, and the first UE may allocate retransmission resources for the HARQ feedback received from the second UE. For example, the first UE may track and/or determine a geographic distance or a radio distance between the first UE and the second UE. In addition, for example, when a distance between the first UE and the second UE exceeds the minimum communication range, the first UE may switch from resource allocation mode 1 to resource allocation mode 2, and the first UE may allocate resources for initial transmission with the second UE. For example, the first UE may not use resources (e.g., resources allocated from the base station) related to resource allocation mode 1 for the initial transmission with the second UE. For example, the first UE may use resources related to resource allocation mode 1 (e.g., resources allocated from a base station) for the next initial transmission.

For example, in relation to the specific trigger condition described above, the first UE may switch the resource allocation mode based on a data rate related to sidelink information. For example, when the first UE determines that the data rate related to the sidelink information is less than a pre-configured threshold value, the first UE may switch from resource allocation mode 1 to resource allocation mode 2. For example, since the operation of the first UE selecting resources in resource allocation mode 2 has lower resource reliability than the operation in which resources is allocated in resource allocation mode 1 (that is, since it has a high interference level), the resource allocation mode 2 may be difficult for the first UE to occupy more resources than in resource allocation mode 1. Accordingly, for example, if the data rate related to the sidelink information is less than a pre-configured threshold value, the first UE may switch to the resource allocation mode 2. For example, if the data rate related to sidelink information is greater than a pre-configured threshold value, the first UE may switch to the resource allocation mode 1. As mentioned above, the triggering time for switching the resource allocation mode may be a time when the first UE allocated to the initial transmission determines retransmission resources and/or a time when the first UE selects the resource allocation mode for the initial transmission for a first time.

In step S1380, the first UE in the switched resource allocation mode 2 may select/determine resources, and the first UE may transmit the sidelink data to the second UE through the selected resources.

Additionally, for example, after the first UE switches from resource allocation mode 1 to resource allocation mode 2, the first UE may fall back to the resource allocation mode 1. For example, after switching from resource allocation mode 1 to resource allocation mode 2, when sidelink information to be newly transmitted is not sensitive to delay (delay insensitive), the first UE may fall back to resource allocation mode 1 and the first UE may be allocated resources from the base station. For example, when a latency budget of the sidelink information to be newly transmitted is greater than a scheduling delay related to the resource allocation mode 1, the first UE may fall back to the resource allocation mode 1, and the first UE may be allocated resources from the base station.

For example, when a condition opposite to the above-described specific trigger condition is satisfied, the first UE may fall back to original resource allocation mode. For example, when a parameter related to the reliability of sidelink information is greater than a preset threshold value, the first UE may fall back from resource allocation mode 2 to resource allocation mode 1. For example, the parameter may have a larger value as the reliability increases. For example, if the round-trip time delay according to scheduling does not exceed the delay time budget, the first UE may fall back from resource allocation mode 2 to resource allocation mode 1. For example, when the distance between the first UE and the second UE is within the minimum communication range, the first UE may fall back from resource allocation mode 2 to resource allocation mode 1. In addition, for example, a resource pool related to resource allocation mode 2 may be independently defined. In this case, if the first UE determines that a congestion level of the resource pool related to the resource allocation mode 2 is higher than the pre-configured threshold, the first terminal may fall back to resource allocation mode 1. That is, the first UE may determine that many nearby UEs are attempting to occupy the resources based on the congestion level of the resource pool related to the resource allocation mode 2. Therefore, the first UE may expect that it may be difficult to schedule resources for sidelink communication with the second UE in resource allocation mode 2, by fall back to the resource allocation mode 1, the first UE may allow the base station to allocate resources for sidelink communication with the second UE to the first UE.

According to an embodiment of the present disclosure, the first UE may switch the resource allocation mode related to the initial and/or retransmission based on a coverage of the base station. For example, if the first UE exists within the coverage of the base station and the first UE is in an RRC connection state, the first UE may be allocated resources from the base station. For example, in a case other than the above-described state (e.g., out-of-coverage), the first UE may select resources by itself using a pre-configured resource pool. For example, in the case of the UE within the coverage of the base station (in-coverage), the base station may perform resource allocation related to the initial and retransmission for the UE. On the other hand, for example, in the case of the UE out-of-coverage of the base station, the UE may switch to resource allocation mode 2 to select resources. That is, for example, the first UE may operate in resource allocation mode 1 when the first UE exists within the coverage of the base station, and the first UE may operate in resource allocation mode 2 when the first UE exists outside the coverage of the base station.

According to an embodiment of the present disclosure, the first UE may be allocated resources related to initial transmission from the base station in resource allocation mode 1, and the first UE may be scheduled for resources related to retransmission from a neighboring scheduling UE. For example, the scheduling UE may be a specific UE designated by a platooning leader, a group leader, or a base station. For example, the scheduling UE may forward or perform scheduling one or more resource grants received from the base station to nearby scheduled UEs. For example, the above-described method may be applied when the UE transmits a packet related to a delay sensitive sidelink service. For example, after the first UE performs initial transmission of sidelink information to the second UE through resources allocated from the base station in resource allocation mode 1, the first UE may receive a HARQ NACK from the second UE. In this case, when a scheduling delay for the first UE to receive resources related to retransmission from the base station is excessively large, the first UE may receive one or more resource grants from a neighboring scheduling UE, or scheduling for the first UE may be performed by a neighboring scheduling UE. For example, when the concurrent operation resource allocation mode is configured to the first UE, the first UE may have a priority for resource allocation mode 1. In this case, the first UE receives a grant from the surrounding scheduling UE while operating in resource allocation mode 1, and the first UE may allocate resources related to initial transmission and/or retransmission in resource allocation mode 2 through the grant. The above-described procedure for switching the resource allocation mode by the first UE related to the scheduling UE will be described in detail.

Figure 14:
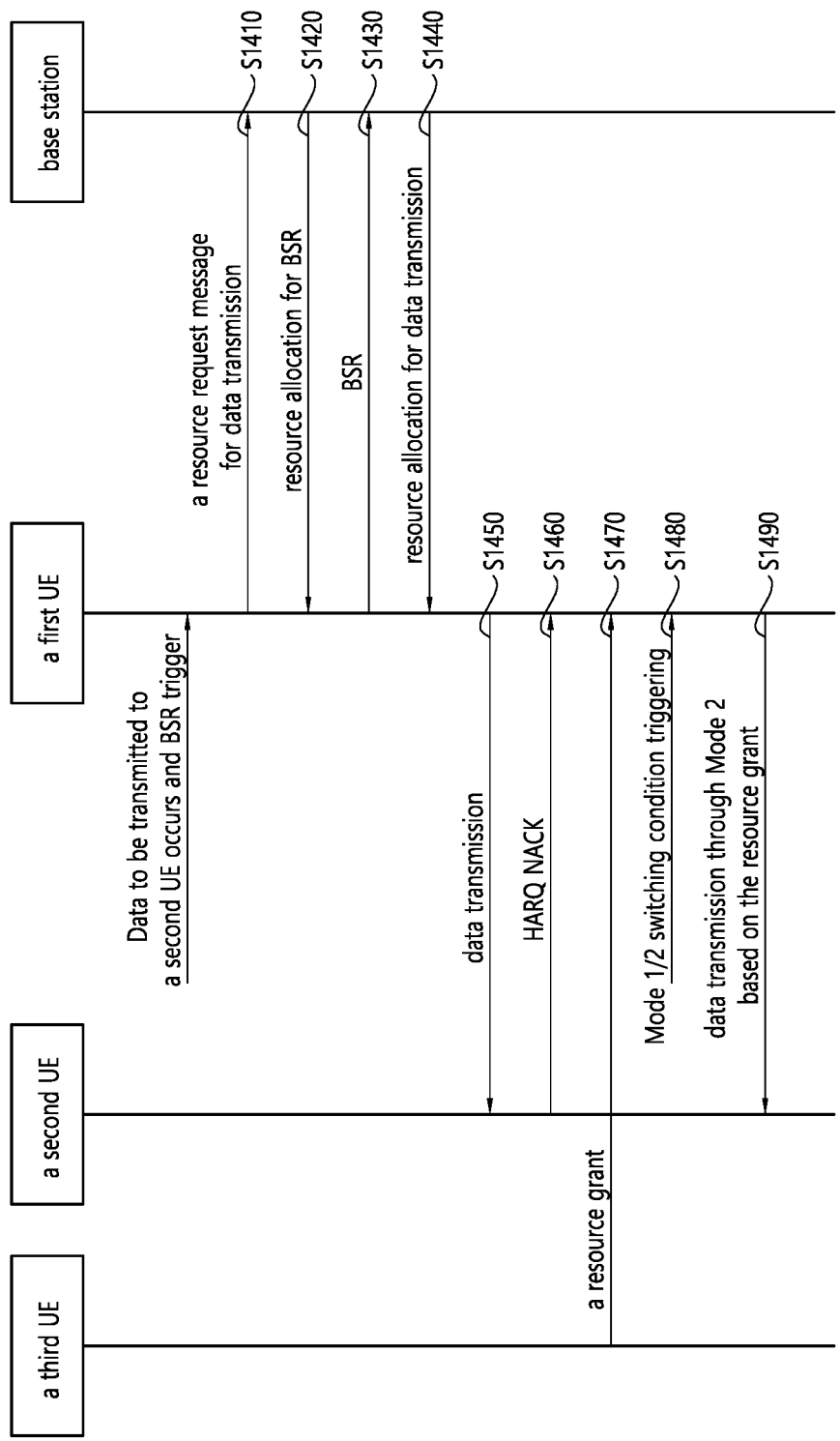
FIG. 14 shows a procedure in which a first UE switches a resource allocation mode through a third UE according to an embodiment of the present disclosure.

FIG. 14 shows a procedure in which a first UE switches a resource allocation mode through a third UE according to an embodiment of the present disclosure. An embodiment of FIG. 14 may be combined with various embodiments of the present disclosure.

Referring to FIG. 14, in step S1410, the first UE may transmit a resource request message for data transmission to the base station. For example, when the first UE generates sidelink data to be transmitted to the second UE and a BSR is triggered for the first UE, the first UE may transmit a resource request message for data transmission to the base station. In step S1420, the first UE may be allocated resources for a BSR from the base station, and in step S1430, the first UE may transmit the BSR from the base station. In step S1440, the first UE may be allocated resources for sidelink data transmission from the base station, and in step S1450, the first UE may transmit sidelink data to the second UE using the resources allocated from the base station. For example, the resources allocated from the base station to the first UE may be resources for initial transmission. For example, the base station may allocate resources to the first UE based on a dynamic resource allocation method or a configured grant type 1 resource allocation method.

In step S1460, the first UE may receive a HARQ feedback from the second UE. In the FIG. 14, it is assumed that the HARQ feedback is a HARQ NACK. In step S1470, the first UE may receive a resource grant from a third UE. For example, the third UE may be a specific UE designated by a platooning leader, a group leader, or the base station. For example, the third UE may the resource grant received from the base station to the first UE or may perform scheduling. For example, the resource grant may be a resource grant related to resource allocation mode 2 received from the base station. For example, the resource grant may be a pre-configured resource grant. For example, if the HARQ feedback is the HARQ NACK, in step S1480, the first UE may switch the resource allocation mode based on a pre-configured triggering condition. For example, the first UE may switch from resource allocation mode 1 to resource allocation mode 2 based on a pre-configured triggering condition. For example, when sidelink data to be retransmitted by the first UE is related to a delay sensitive sidelink service, the first UE may be configured to switch from resource allocation mode 1 to resource allocation mode 2. For example, based on that sidelink data to be retransmitted by the first UE corresponds to a delay sensitive sidelink service, the first UE may switch to resource allocation mode 2, and the first UE may use the resource grant received from the third UE. For example, if a delay for allocating resources related to retransmission from the base station is excessively large for the first UE, the first UE may switch to resource allocation mode 2. For example, when a delay for allocating resources related to retransmission from the base station is greater than a pre-configured threshold value, the first UE may switch to resource allocation mode 2. For example, if a delay for allocating resources related to retransmission from the base station is greater than a latency budget related to sidelink information, the first UE may switch to resource allocation mode 2.

In step S1490, the first UE may retransmit the sidelink data to the second UE through the resource grant received from the third UE in resource allocation mode 2. For example, if a delay for being allocated from the base station is excessively large for the first UE, the first UE may retransmit the sidelink data to the second UE through the resource grant received from the third UE in resource allocation mode 2. For example, when a delay for allocating resources related to retransmission from the base station is greater than a pre-configured threshold, the first UE may retransmit the sidelink data to the second UE through the resource grant received from the third UE in resource allocation mode 2. For example, if a delay for allocating resources related to retransmission from the base station is greater than a latency budget related to sidelink information, the first UE may retransmit the sidelink data to the second UE through the resource grant received from the third UE in resource allocation mode 2.

Additionally, for example, the above-described step S1470 may be omitted. For example, in this case, the first UE may associated with the third UE based on not receiving the resource grant from the third UE, the first UE may request resource allocation related to retransmission from the third UE. For example, the third UE may receive the request for the resource allocation related to retransmission from the first UE, and the third UE may transmit a resource grant to the first UE.

For example, the above-described step S1470 may be performed during a process (e.g., steps S1410 to S1440) in which the first UE receives resource allocation related to initial transmission from the base station.

According to an embodiment of the present disclosure, the first UE may be configured to perform the resource allocation mode 1 with priority over the resource allocation mode 2. For example, the first UE may prioritize resource allocation mode 1 over resource allocation mode 2. For example, as described above, a reliability of resources related to the resource allocation mode 1 may be higher than a reliability of resources related to the resource allocation mode 2 in general. In addition, for example, if there are no special problems, within a coverage of the base station, the UE may use resources allocated by the base station. However, to support sidelink services related to safety, the UE may need to successfully receive data within a specific latency budget. Accordingly, a UE supporting resource allocation mode 1 may preferentially perform initial transmission and/or retransmission through resources allocated from a base station. At this time, for example, after the UE attempts SR and/or BSR to receive resources related to retransmission, it may be difficult for the UE to be allocated resources related to retransmission from the base station within the latency budget related to sidelink information due to occur errors in a Uu interface. In this case, the UE may switch from resource allocation mode 1 to resource allocation mode 2. That is, if there are resources allocated from the base station in resource allocation mode 1, the UE may be configured to preferentially use the resources allocated from the base station.

According to an embodiment of the present disclosure, when the above-described switching criterion is not satisfied for the UE supporting the simultaneous operation resource allocation mode, the UE may be configured to have a higher priority of the resources allocated by the base station through a grant in resource allocation mode 1 than a priority of the reserved/selected resources in resource allocation mode 2. That is, when the above-described switching criterion is not satisfied, the UE may perform the operation related to the resource allocation mode 1 in preference to the operation related to the resource allocation mode.

According to an embodiment of the present disclosure, after the UE supporting the simultaneous operation resource allocation mode occupies resources in resource allocation mode 2, if resources are allocated from the base station through resource allocation mode 1, the UE may preferentially use the resources scheduled through resource allocation mode 1. For example, although the UE allocates and reserves resources through resource allocation mode 2, since the UE is allocated resources from the base station through resource allocation mode 1, the UE may perform initial transmission and/or retransmission through the resources allocated from the base station. For example, it may be an operation related to the resource allocation mode selection of the UE. That is, for example, while the UE performs initial transmission and/or retransmission in resource allocation mode 2, when the UE receives a grant related to resource allocation from the base station, the UE pending the resources reserved in resource allocation mode 2, and the UE may transmit sidelink information by preferentially using the resource allocated by the base station. For example, the UE may release the resources reserved in the resource allocation mode 2 while performing the operation related to the resource allocation mode 1. In addition, for example, the UE may use the resource reserved in the resource allocation mode 2 after completing the operation related to the resource allocation mode 1.

According to various embodiments of the present disclosure, the UE may transmit specific information to the base station based on switching the resource allocation mode. For example, when the UE switches from resource allocation mode 1 to resource allocation mode 2, the UE may transmit information related to mode switching to the base station. For example, the UE may report an indication for mode switching to the base station. For example, the base station may recognize that the UE switches to resource allocation mode 2 based on the information related to mode switching. For example, the base station may stop resource allocation related to resource allocation mode 1 based on the information related to mode switching. In addition, for example, after the UE switches to resource allocation mode 2, the UE may transmit information for a usage portion of the resources related to resource allocation mode 2 to the base station. For example, the base station may determine whether to perform the scheduling related to the resource allocation mode 1 to the UE based on the information for a usage portion of the resources related to resource allocation mode 2. In addition, for example, when the simultaneous operation resource allocation mode is configured to use a shared resource pool, the UE may transmit information related to the resource selection and the information for the usage portion of the resources related to the resource allocation mode 2 to the base station. The base station may perform scheduling related to resource allocation mode 1 for avoiding resources related to resource allocation mode 2 for the UE based on the information related to the resource selection and the information for the usage portion of the resources related to the resource allocation mode 2.

For example, the UE may transmit specific parameters (for example, resource sensing information of a shared resource pool, preference information related to resource allocation mode 1 and/or resource allocation mode 2 of the UE, information related to whether the UE is internally switched, resource usage ratio of resource allocation mode 1 or resource usage ratio of resource allocation mode 2 from resources of resource allocation mode 1 and resources of resource allocation mode 2) to the base station, and the base station may determine whether to switch the resource allocation mode. That is, for example, the base station may explicitly signal a switching indication of the resource allocation mode to the UE based on the parameters transmitted by the UE. Alternatively, for example, the UE may implicitly know whether the resource allocation mode is switched, by allocating an independent resource pool for the determined resource allocation mode to the UE by the base station.

Therefore, according to an embodiment of the present disclosure described above, when data transmission between UEs or data transmission fails in sidelink communication, by allocating transmission resources by the UE itself, data transmission between UEs may be possible, and reliability for data transmission can be improved.

Figure 15:
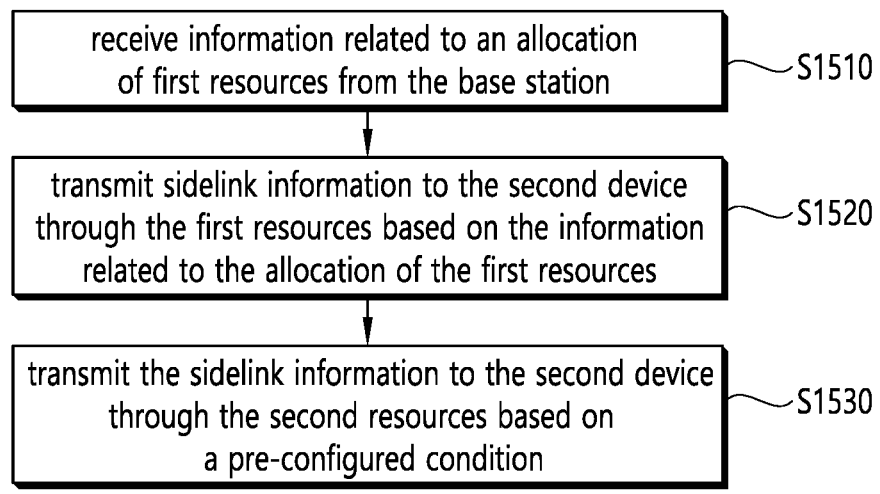
FIG. 15 shows a method for a first device 100 to switch a resource allocation mode according to an embodiment of the present disclosure.

FIG. 15 shows a method for a first device 100 to switch a resource allocation mode according to an embodiment of the present disclosure. An embodiment of FIG. 15 may be combined with various embodiments of the present disclosure.

Referring to FIG. 15, in step S1510, the first device 100 may receive information related to an allocation of first resources from the base station. For example, the first device 100 may receive information related to the allocation of the first resources from the base station in resource allocation mode 1. For example, the information related to the allocation of the first resources may include information on resources for the first device 100 to perform sidelink communication with a second device 200.

In step S1520, the first device 100 may transmit sidelink information to the second device 200 through the first resources based on the information related to the allocation of the first resources. For example, the first resources may be resources allocated to the first device 100 by the base station. For example, the sidelink information may include at least one of a sidelink message, a sidelink packet, a sidelink service, sidelink data, sidelink control information, and/or a sidelink transport block (TB). For example, second resources may be resources allocated by the first device 100 for sidelink communication with the second device 200. For example, the second resources may be resources allocated to the first device 100 by the third device determined by the base station. For example, a priority of the first resources may be higher than a priority of the second resources.

In step S1530, the first device 100 may transmit the sidelink information to the second device 200 through the second resources based on a pre-configured condition. For example, the second resources may be resources allocated by the first device 100 for sidelink communication with the second device 200. For example, based on a reliability parameter of the sidelink information is less than a pre-configured threshold value, the first device 100 may determine the second resources related to sidelink communication with the second device 200. For example, based on a latency related to transmission of the sidelink information is less than a pre-configured threshold value, the first device 100 may determine the second resources related to sidelink communication with the second device 200. For example, the pre-configured threshold value compared with the latency may include a delay time related to scheduling of the base station and a processing delay time related to transmission of sidelink information using the first resources. For example, based on a distance between the first device 100 and the second device 200 being greater than a minimum communication range, the first device 100 may determine the second resources related to sidelink communication with the second device 200. For example, based on a data rate of the sidelink information being smaller than a pre-configured threshold value, the first device 100 may determine the second resources related to sidelink communication with the second device 200.

For example, the second resources may be resources allocated to the first device 100 by the third device determined by the base station. In this case, for example, based on a delay time related to the scheduling of the base station is greater than a pre-configured threshold, the second resources may be allocated to the first device 100 by the third device. For example, the scheduling of the base station may be related to retransmission of the first device.

For example, based on a congestion level of the second resources being greater than a pre-configured threshold value, the first device 100 may transmit the sidelink information to the second device 200 through the first resources.

For example, the first device 100 may transmit information related to a usage of the second resources to the base station. For example, the scheduling of the base station for the first device 100 may be determined based on the information related to the usage of the second resources.

The above-described embodiment may be applied to various devices to be described below. First, for example, the processor 102 of the first device 100 may control the transceiver 106 to receive information related to an allocation of first resources from the base station. And, the processor 102 of the first device 100 may control the transceiver 106 to transmit sidelink information to the second device 200 through the first resources based on the information related to the allocation of the first resources. And, the processor 102 of the first device 100 may control the transceiver 106 to transmit the sidelink information to the second device 200 through second resources based on a pre-configured condition.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive information related to an allocation of first resources from a base station, and transmit sidelink information to a second device through the first resources based on the information related to the allocation of the first resources, and transmit the sidelink information to the second device through second resources based on a pre-configured condition.

According to an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive information related to an allocation of first resources from a base station, and transmit sidelink information to a second UE through the first resources based on the information related to the allocation of the first resources, and transmit the sidelink information to the second UE through second resources based on a pre-configured condition.

According to an embodiment of the present disclosure, a non-transitory computer-readable storage medium storing instructions may be provided. For example, the instructions, when executed, cause a first device to: receive information related to an allocation of first resources from a base station, and transmit sidelink information to a second device through the first resources based on the information related to the allocation of the first resources, and transmit the sidelink information to the second device through second resources based on a pre-configured condition.

Figure 16:
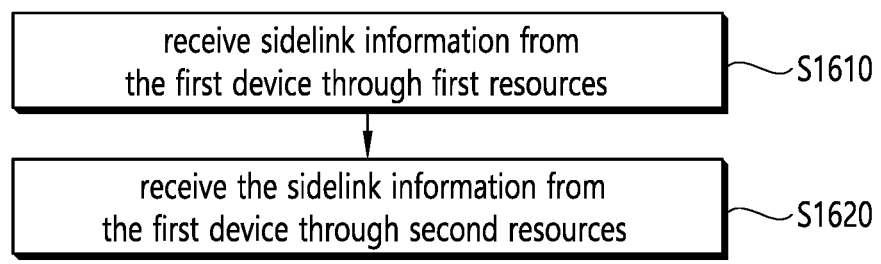
FIG. 16 shows a method for the second device 200 to re-receive sidelink information from the first device 100 according to an embodiment of the present disclosure.

FIG. 16 shows a method for the second device 200 to re-receive sidelink information from the first device 100 according to an embodiment of the present disclosure. An embodiment of FIG. 16 may be combined with various embodiments of the present disclosure.

Referring to FIG. 16, in step S1610, the second device 200 may receive sidelink information from the first device 100 through first resources. For example, the first resources may be resources allocated to the first device 100 by the base station. For example, the sidelink information may include at least one of a sidelink message, a sidelink packet, a sidelink service, sidelink data, sidelink control information, and/or a sidelink transport block (TB). For example, when the second device 200 fails to receive the sidelink information, the second device 200 may transmit HARQ feedback (e.g., HARQ NACK) to the first device 100.

In step S1620, the second device 200 may receive the sidelink information from the first device through second resources. For example, the second resources may be determined for sidelink communication with the second device 200 by the first device 100 or the third device based on a pre-configured condition. For example, the second resources may be determined by the first device 100 based on the HARQ NACK received by the first device 100. For example, a priority of the first resources may be higher than a priority of the second resources.

For example, based on a reliability parameter of the sidelink information is less than a pre-configured threshold value, the second resources may be determined by the first device 100. For example, based on a latency related to transmission of the sidelink information is less than a pre-configured threshold value, the second resources may be determined by the first device 100. For example, the pre-configured threshold value compared with the latency may include a delay time related to scheduling of the base station and a processing delay time related to transmission of sidelink information using the first resources. For example, based on a distance between the first device 100 and the second device 200 being greater than a minimum communication range, the second resources may be determined by the first device 100. For example, based on a data rate of the sidelink information being smaller than a pre-configured threshold value, the second resources may be determined by the first device 100.

For example, the second resources may be resources allocated to the first device 100 by the third device determined by the base station. In this case, for example, based on a delay time related to the scheduling of the base station is greater than a pre-configured threshold, the second resources may be allocated to the first device 100 by the third device. For example, the scheduling of the base station may be related to retransmission of the first device.

For example, based on a congestion level of the second resources being greater than a pre-configured threshold value, the second device 200 may receive the sidelink information from the first device 100 through the first resources.

The above-described embodiment may be applied to various devices to be described below. First, for example, the processor 202 of the second device 200 may control the transceiver 206 to receive sidelink information from the first device 100 through first resources. And, the processor 202 of the second device 200 may control the transceiver 206 to receive the sidelink information from the first device 100 through second resources.

According to an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive sidelink information from the first device through first resources, and receive the sidelink information from the first device through second resources. Here, the first resources may be resources allocated to the first device by the base station, and the second resources may be resources determined by the first device or a third device for sidelink communication with the second device based on a pre-configured condition.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
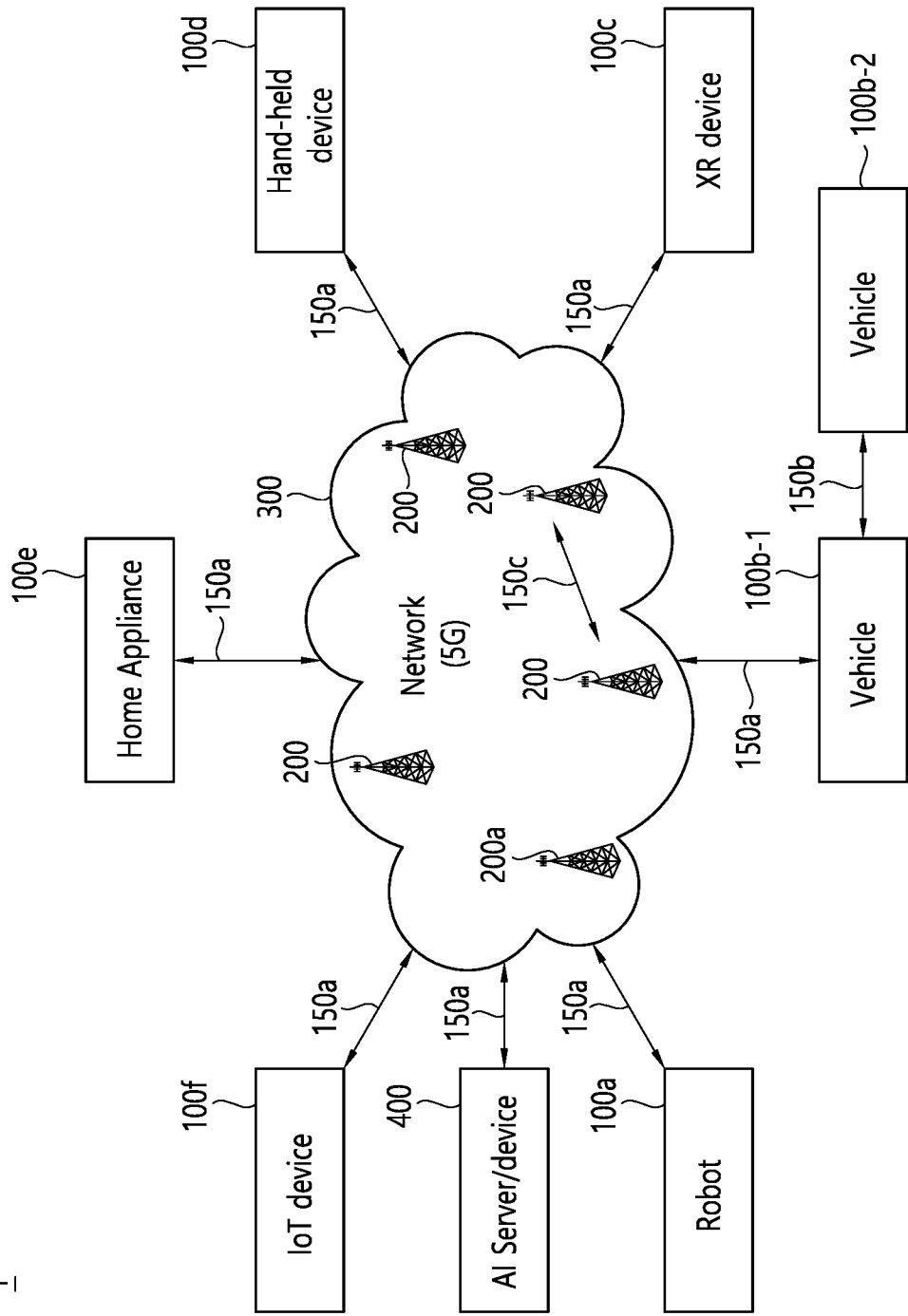
FIG. 17 shows a communication system 1, in accordance with an embodiment of the present disclosure.

FIG. 17 shows a communication system 1, in accordance with an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
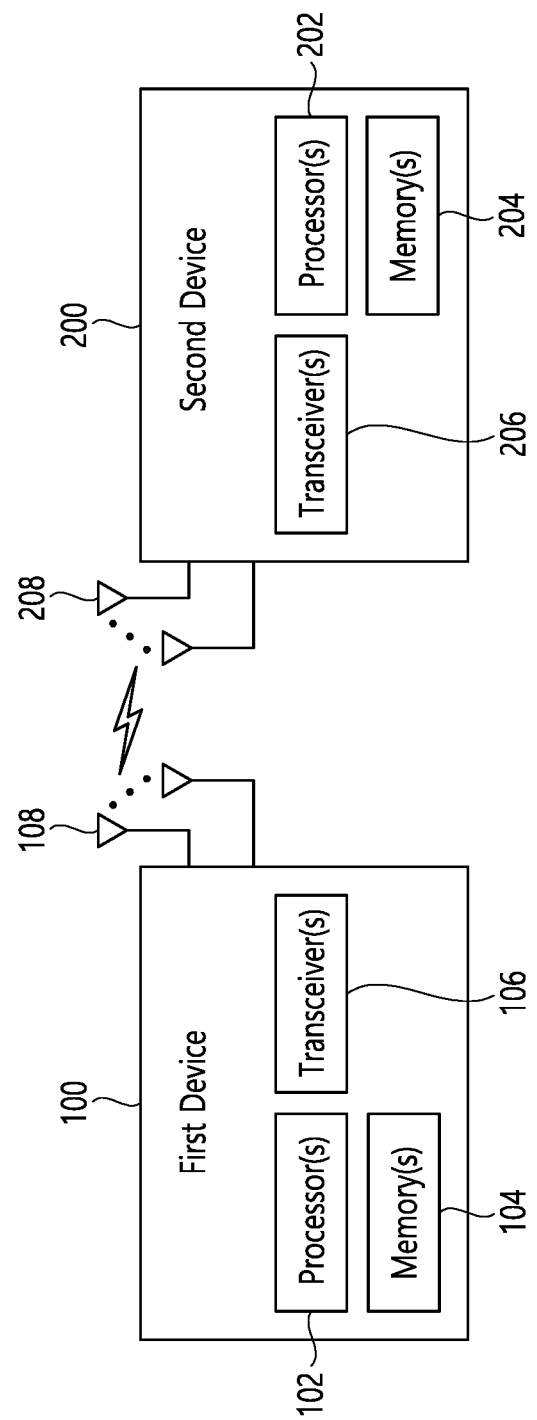
FIG. 18 shows wireless devices, in accordance with an embodiment of the present disclosure.

FIG. 18 shows wireless devices, in accordance with an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
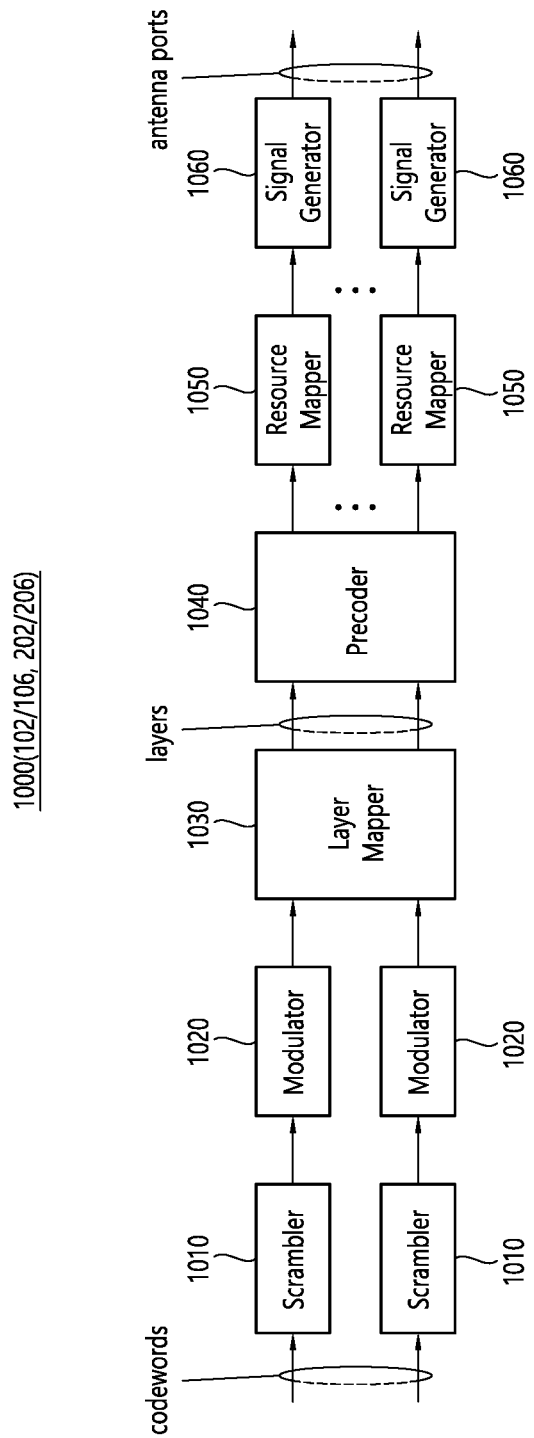
FIG. 19 shows a signal process circuit for a transmission signal, in accordance with an embodiment of the present disclosure.

FIG. 19 shows a signal process circuit for a transmission signal, in accordance with an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
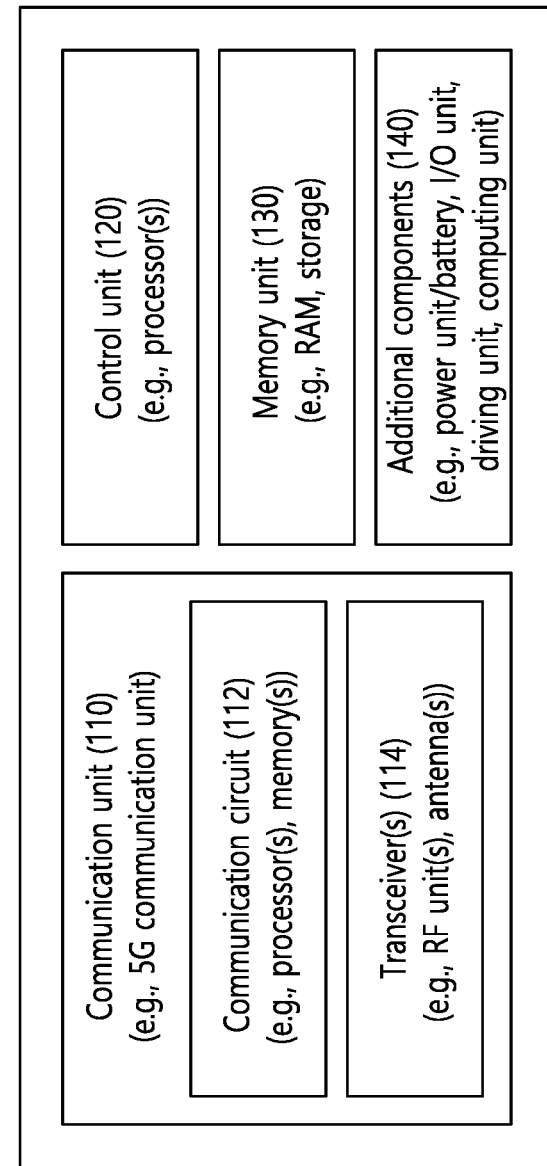
FIG. 20 shows a wireless device, in accordance with an embodiment of the present disclosure.

FIG. 20 shows another example of a wireless device, in accordance with an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
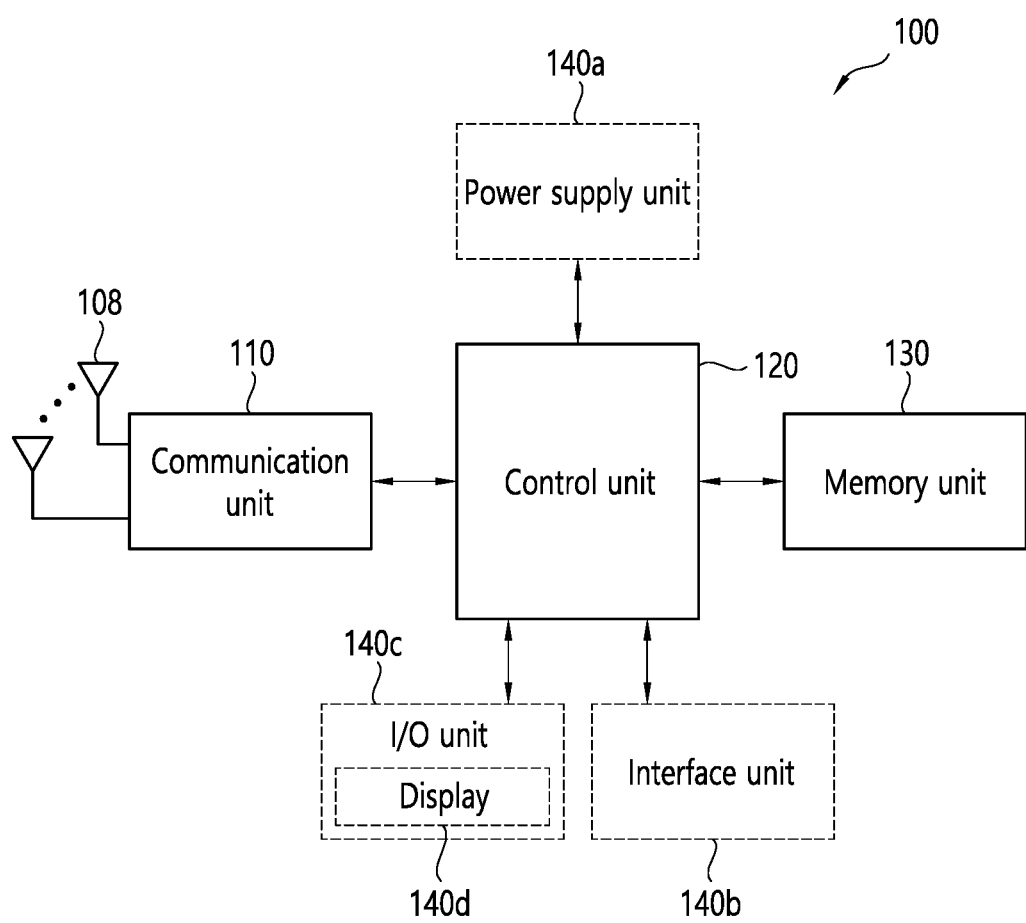
FIG. 21 shows a hand-held device, in accordance with an embodiment of the present disclosure.

FIG. 21 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 22 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   receiving information related to an allocation of a first resource from a base station to the first device;
   transmitting sidelink information to a second device through the first resources-resource based on the information related to the allocation of the first resources;
   selecting, by the first device, a second resource for sidelink communication with the second device based on a latency budget related with transmission of the sidelink information being less than a sum of a delay time related to scheduling of the base station and a processing delay time related to transmission of the sidelink information; and
   transmitting the sidelink information to the second device through the selected second resources.

2. The method of claim 1, wherein
   the second resource for the sidelink communication with the second device is selected based on (i) the latency budget being less than the sum and (ii) a reliability parameter of the sidelink information being less than a pre-configured first threshold value.

3. The method of claim 1, wherein the second resource for the sidelink communication with the second device is selected based on (i) the latency budget being less than the sum and (ii) a resource periodicity of a grant resource scheduled by the base station being less than a pre-configured second threshold value.

4. The method of claim 1, wherein
   the second resource for the sidelink communication with the second device based on (i) the latency budget being less than the sum and (ii) a distance between the first device and the second device being greater than a minimum communication range.

5. The method of claim 1, wherein
   selecting the second resource for the sidelink communication with the second device based on (i) the latency budget being less than the sum and (ii) a data rate of the sidelink information being less than a pre-configured third threshold value.

6. The method of claim 1, further comprising:
   receiving information related to an allocation of a third resource from the base station to the first device based on a congestion level of the second resource being greater than a pre-configured fourth threshold value.

7. The method of claim 1, wherein the first resource is a resource allocated by the base station to the first device, and
   wherein the second resource is a resource allocated to the first device by a third device determined by the base station.

8. The method of claim 7, wherein based on that the delay time related to the scheduling of the base station being greater than a pre-configured fifth threshold value, the second resource is allocated for the first device, and
   wherein the scheduling of the base station is related to retransmission of the first device.

9. The method of claim 8, further comprising:
   transmitting information related to a usage of the second resource to the base station, and
   wherein the scheduling of the base station for the first device is determined based on the information related to the usage of the second resource.

10. The method of claim 1, wherein a priority of the first resource is higher than a priority of the second resource.

11. A first device for performing wireless communication, the first device comprising:
    one or more memories storing instructions;
    one or more transceivers; and
    one or more processors connected to the one or more memories and the one or more transceivers, wherein the one or more processors execute the instructions to:
    receive information related to an allocation of a first resource from a base station to the first device;
    transmit sidelink information to a second device through the first resources based on the information related to the allocation of the first resource;
    select, by the first device, a second resource for sidelink communication with the second device based on a latency budget related with transmission of the sidelink information being less than a sum of a delay time related to scheduling of the base station and a processing delay time related to transmission of the sidelink information; and
    transmitting the sidelink information to the second device through the selected second resource.

12. An apparatus configured to control a first device, the apparatus comprising:
    one or more processors; and
    one or more memories being operably connectable to the one or more processors and storing instructions, wherein the one or more processors execute the instructions to:
    receive information related to an allocation of a first resource from a base station to the first device,
    transmit sidelink information to a second device through the first resources based on the information related to the allocation of the first resource, select, by the first device, a second resource for sidelink communication with the second device, based on a latency budget related with transmission of the sidelink information being less than a sum of a delay time related to scheduling of the base station and a processing delay time related to transmission of the sidelink information, and transmit the sidelink information to the second device through the selected second resource.

* * * * *